United States Patent [19]

Hanson

[11] 4,111,624

[45] Sep. 5, 1978

[54] DOUGH PIECE IMPRINTER AND CONTROLS THEREFORE

[76] Inventor: Douglas R. Hanson, 1720-9th Ave. So., Anoka, Minn. 55303

[21] Appl. No.: 736,382

[22] Filed: Oct. 28, 1976

[51] Int. Cl.² ............................................. A21C 11/02
[52] U.S. Cl. ...................................... 425/135; 101/35; 101/235; 101/DIG. 3; 425/385
[58] Field of Search ................... 101/DIG. 3, 35, 235, 101/234, 233, 44, 43; 425/385, 299, 135, 141, 145, 150

[56] References Cited

U.S. PATENT DOCUMENTS

| 1,291,168 | 1/1919 | Ruger | 425/385 |
| 1,339,881 | 5/1920 | De Barros | 101/44 |
| 3,031,956 | 5/1962 | Worth | 101/35 X |
| 3,037,447 | 6/1962 | Gonzalez et al. | 101/235 X |
| 3,092,019 | 6/1963 | Van Buskirk | 101/DIG. 3 |
| 3,260,193 | 7/1966 | Mann | 101/235 X |
| 3,516,353 | 6/1970 | Gates | 101/233 X |
| 3,536,014 | 10/1970 | Kuchuris | 425/385 X |

FOREIGN PATENT DOCUMENTS

| 1,252,603 | 10/1967 | Fed. Rep. of Germany | 425/385 |
| 1,912,067 | 9/1970 | Fed. Rep. of Germany | 425/385 |

*Primary Examiner*—Clifford D. Crowder
*Attorney, Agent, or Firm*—Kinney, Lange, Westman & Fairbairn

[57] ABSTRACT

Imprinters or stampers for imprinting or stamping numerals, letters or symbols into the top of pieces of dough prior to baking, which includes means for individually sensing each piece of dough to insure that the imprinting device is properly timed for imprinting the dough pieces.

10 Claims, 11 Drawing Figures

DOUGH PIECE IMPRINTER AND CONTROLS THEREFORE

BACKGROUND OF THE INVENTION

1. Field of the Invention

The present invention relates to dough imprinters for placing symbols, letters, or numerals onto dough pieces prior to baking.

2. Prior Art

In the prior art various dough piece imprinters or stampers have been advanced. Usually these include a set of rotary blocks much like a rotary printing device that carry the symbol, letter, or numeral that is to be imprinted on a piece of dough. The blocks are generally mounted onto a common shaft, and are operated simultaneously in response to position of a row of dough pieces carried on a conveyor. This will work in instances where the dough pieces are properly aligned across a traveling conveyor belt, but such instances are generally few and far between. The dough pieces in a row are many times shifted slightly relative to each other, so uniformity of imprinting is not easily obtained with the existing devices.

SUMMARY OF THE INVENTION

The present invention relates to a dough piece imprinting or stamping device for imprinting characters such as numerals, symbols, or letters onto dough pieces as the dough pieces are carried on a conveyor prior to baking. The term "character" is intended to cover any type of symbol, letter, numeral, trademark logo, or other emblem that is to be imprinted.

In the form as shown, each of the dough pieces carried on a conveyor belt is individually sensed relative to its respective imprinting device. The imprinting devices themselves are powered and when a signal indicating that a dough piece is approaching the respective imprinter is received it will operate causing the character to be imprinted into the dough piece.

The sensing device can be any desired type of device, but as shown in one form an air sensor having a low pressure jet that is closed off by a movable member which in turn is positioned in the path of the dough pieces to be sensed by the sensor. When the movable member moves, the drop in pressure in the line supplying the jet is used as a signal for operating through fluid pressure sensitive devices and a fluid amplifier to in turn operate a valve and actuate a latch cylinder. When the latch cylinder is actuated the imprinter is also released and is individually powered to move in time with the movement of the dough piece to imprint the character properly.

In another form of the invention a proximity sensor senses movement of a member and operates a solenoid to release the imprinter.

The device is relatively easy to install on any standard dough piece conveyor, and provides for uniformity in imprinting, which in turn connotes high quality of baked products.

BRIEF DESCRIPTION OF THE DRAWINGS

FIG. 1 is a side elevational view of a portion of a typical dough conveyor that is shown schematically, and which is carrying dough pieces therealong, with the imprinter made according to the present invention installed thereon;

DESCRIPTION OF THE PREFERRED EMBODIMENTS

Figures 2, 3:
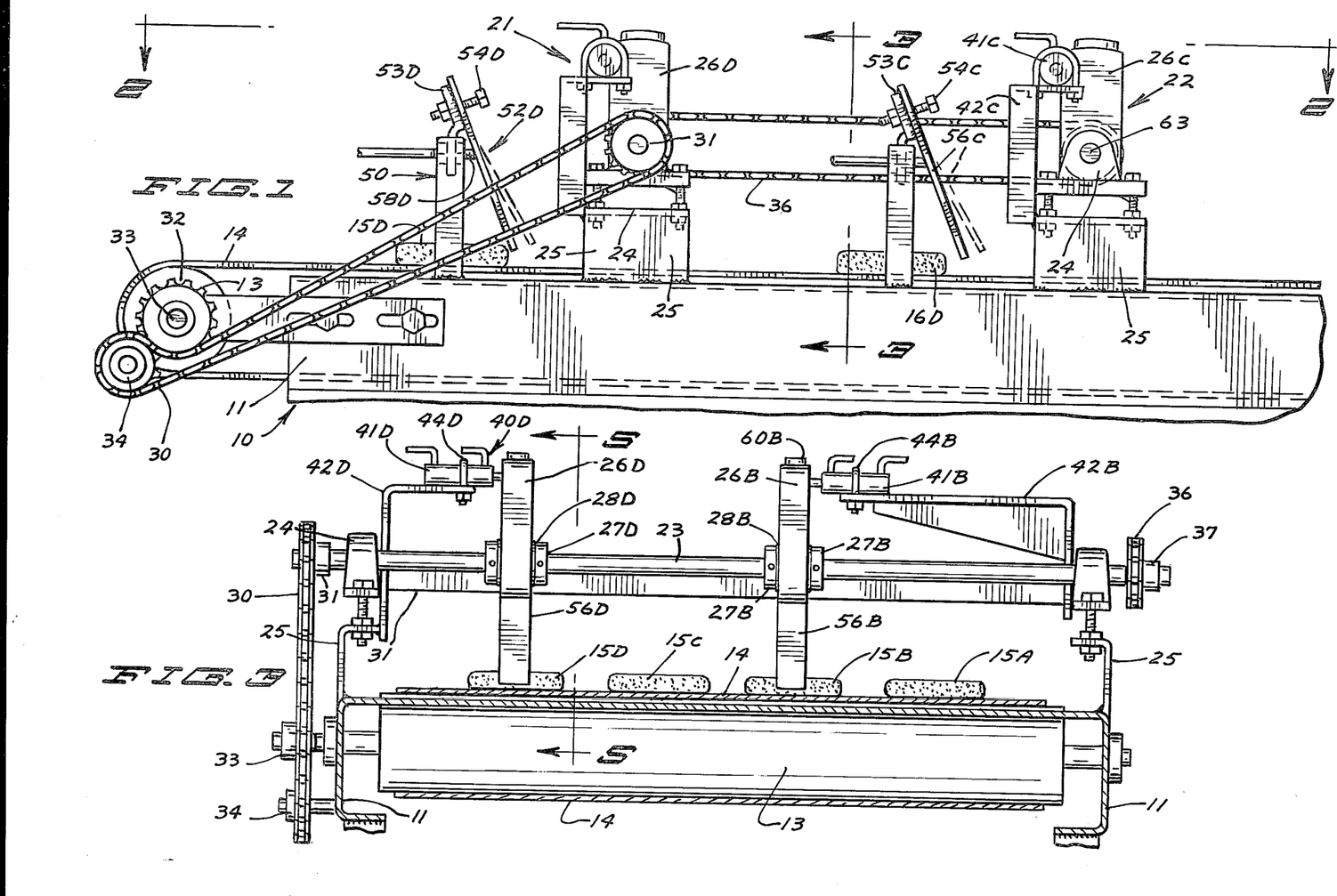
FIG. 2 is a plan view taken as on line 2—2 in FIG. 1.
FIG. 3 is a sectional view taken as on line 3—3 in FIG. 1.
Figure 2:
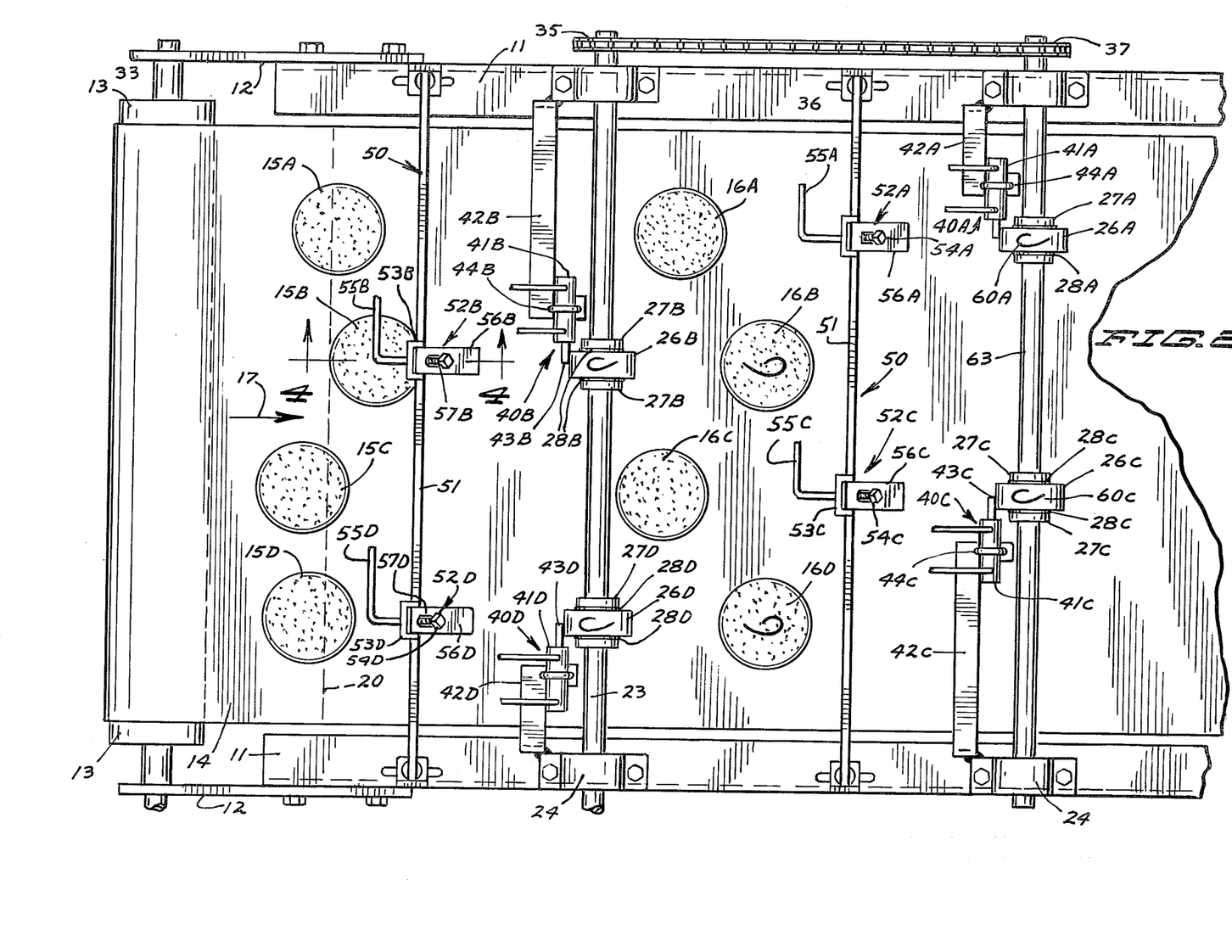

Referring to FIGS. 1 and 2, a conveyor assembly illustrated generally at 10 as shown has a pair of side rail members 11,11 carrying supports 12 for supporting a conveyor roller 13. A conveyor belt 14 is mounted over the roller 13 and extends in a desired direction. The conveyor assembly 10 is shown schematically for illustrative purposes only, and is located near a dough forming machine which will drop pieces of dough onto the conveyor belt 14 for conveying them from one location to another, for example from a dough molder to a panning machine. It might be pointed out that dough panning devices and improvements therein are shown in my copending U.S. patent application Ser. No. 601,352, Filed Aug. 4, 1975, now U.S. Pat. No. 4,019,621, which shows a typical handling arrangement.

Two transverse ranks of dough pieces are shown. A trailing rank is indicated at 15A, 15B, 15C and 15D, and a leading rank or row of dough pieces is indicated at 16A, 16B, 16C and 16D. The dough pieces are deposited on the conveyor belt 14 and are carried in the direction as indicated by the arrow 17 (FIG. 2). As can be seen in FIG. 2, it is common that the dough pieces in a row do not line up transversely (in ranks) across the belt, although generally their alignment in longitudinal direction of the conveyor belt (in files) is quite accurate because of the way that the molder will drop the dough pieces onto the belt. The nozzles or spouts that discharge the dough pieces are positioned quite accurately across the belt and do not shift and the files of dough pieces are thus straight. That is the piece in the "A" file (15A and 16A and others) are in a line, as are the dough pieces in the "B", "C" and "D" files shown. Because the belt 14 is moving as the dough pieces drop, if one of the pieces is dropped out of its nozzle early, or late, it will be staggered along a transverse line or rank, for example with respect to the dotted line shown at 20 in FIG. 2.

In conventional dough imprinting apparatus, the imprinters operate simultaneously along a common transverse line on the conveyor, and it can be seen that some of the dough pieces may not be imprinted, and others will have the imprinted character off center.

In the present device, there are individual dough piece imprinter blocks for each of the files of dough pieces. There is a first set of imprinter blocks indicated generally at 21, and a second set of imprinter blocks indicated generally at 22. The first and second sets of imprinter blocks are spaced from each other in longitudinal direction of the conveyor. The first set of imprinter blocks shown generally at 21 comprises a cross shaft 23 mounted on suitable bearings 24 that in turn are vertically adjustably mounted on supports 25 that are fixed to the side frames 11,11 of the conveyor respectively. The vertical adjustment is to insure that the imprinter blocks will contact the dough pieces with sufficient force to cause imprinting of the character. As shown, the cross shaft 23 has two imprinting blocks mounted thereon. There is a first block 26B and a second block 26D which are rotatably mounted on the shaft 23, and each block is held between a pair of collars shown at 27B and 27D, respectively. The collars in turn bear against friction discs 28B and 28D, respectively, on opposite sides of the respective embossing blocks. The collars and friction discs tend to frictionally drive the imprinting blocks with the shaft 23.

The shaft 23 is driven by a chain indicated generally at 30. That drives a sprocket 31 and is driven by a sprocket 32 which is driven on the shaft 33 of roller 14. A reverse wrap sprocket 34 is mounted on the frame to obtain proper direction of rotation of shaft 23.

A sprocket 35 on the opposite end of shaft 23 drives a chain 36 that drives a sprocket 37 drivably mounted on a second imprinter shaft 63.

Referring specifically again to FIG. 2, the individual imprinting blocks 26B and 26D, are normally restrained from rotation with the shaft 23 and the friction discs 28B and 28D will continuously slip while the shaft 23 is being rotated. The frictional force tends to urge the imprinting blocks 26B and 26D to rotate.

The restraining devices are identically constructed and are shown generally at 40A, B, C and D. The restraining device for block 26B will be explained in detail but the restraining devices are the same for the other blocks. Device 40B comprises a fluid pressure cylinder 41B that is mounted onto a support 42B that in turn is attached back to the support 25 on the adjacent side frame 11 of the conveyor. The cylinder 41B is a double acting cylinder, and as will be explained, the cylinder rod 43B is normally urged outwardly under a regulated air pressure because of the use of a spring return valve for control. The controls will be subsequently discussed in more detail. The cylinder 41B can be held with a suitable clamp 44B to the support 42B and the rod 43B normally protrudes into the path of rotation of the imprinting block 26B. The rod 43B will restrain the block 26B from rotation until the rod is retracted. The rod 43B thus acts as a releasable latch finger.

Likewise, the imprinting block 26D is held from rotation by stop assembly 40D including a pneumatic or fluid pressure cylinder 41D, that is supported on the support 42D that in turn is fastened back at the support 25 for the adjacent side frame member 11. The cylinder rod 43D normally protrudes into the path of rotation of the imprinting block 26D, and restrains the block from rotation. The rod 43D acts as a releasable latch finger. The cylinder 41D likewise is normally under pressure so that the rod 43D is extended. The friction discs 28D will slip continuously when the rod 43D is extended, restraining the imprinting block from rotation. A typical showing of the controls for each of the cylinders 41 is shown schematically in FIG. 4, in relation to the cylinder 41B. Identical controls are used with each of the individual latch cylinders. It should be noted that with each imprinting block like numbers are used to designate like parts, with the letters designating the location of the parts or in other words the letters designate the line of dough pieces with which the parts are associated.

In the form shown, a pair of support members 50 are attached to the opposite side frames 11,11 at spaced locations on the belt. One member 50 is at a position leading the shaft 23 with respect to the direction of movement of the dough pieces. The supports 50 are bridge type frames having cross members 51 that extend all the way across (and above) the conveyor belt. At locations aligning with the respective files of dough pieces and the imprinting blocks, (for example 26B and 26D on the first cross member), sensing devices 52B and 52D are positioned on one cross member 50 and devices 52A and 52C are on the other.

The sensing devices in the form shown are merely for illustrative purposes and any type of sensors can be used, for example photoelectric sensors, moisture sensors, infrared sensors, microwave sensors, or suitable intrusion detectors can be adapted for sensing the position of the individual dough pieces 15 or 16 as they move with the conveyor belt.

Figure 4:
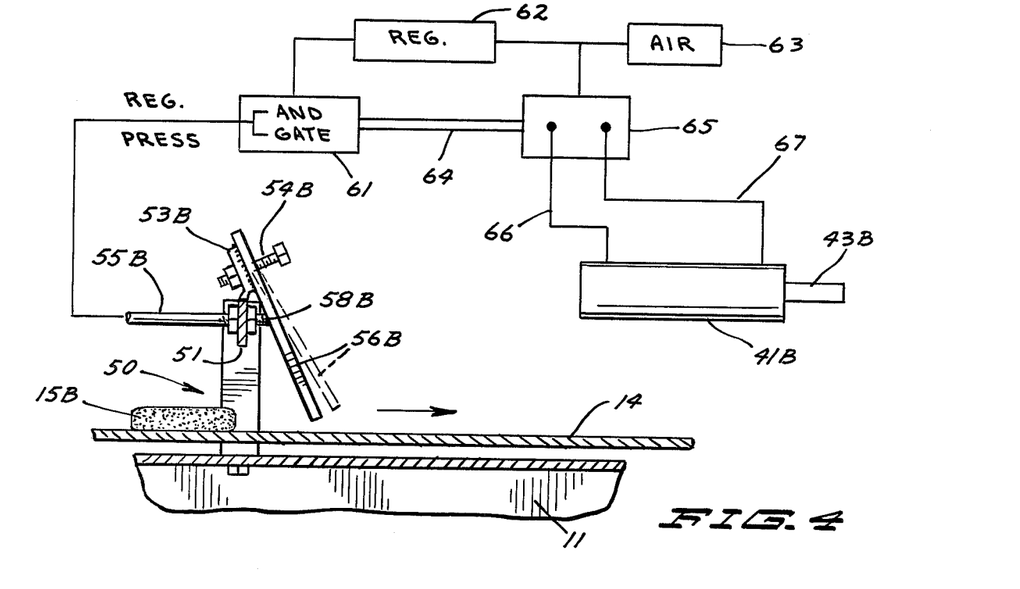
FIG. 4 is a part schematic representation of a dough piece sensor and control device used with the imprinter of the present invention and taken as on line 4—4 in FIG. 2.

Referring to the support 50 at the left side of FIG. 2, in the form shown, the cross member 51 supports angled lugs 53B and 53D, respectively, and the lugs in turn each mount a suitable cap screw 54B and 54D, respectively. Tubes 55 (as shown in FIG. 4, 55B) are mounted on the cross members 51 and aligned with the respective lugs 53. The tubes are attached with suitable lock nuts, and each tube in turn has a nozzle end against which a small flapper member 56 rests. The flapper member 56B as shown typically in FIG. 4 is a light piece of substantially rigid plastic that has a large hole indicated at 57B and through which the cap screw 54B extends. The flapper 56B (or 56A, 56C, or 56D) is free to pivot or move on the stud 54B under external forces.

As can be seen in FIG. 4, the lower end of the flapper 56B is spaced a slight distance above the conveyor belt 14, when in its position shown in FIG. 4 resting against the end of the tube 55B. The end of the tube actually forms a pneumatic nozzle 58B, and the flapper 56B is sufficient to substantially close off the air flow through this nozzle.

The tubes 55 are connected through to separate pneumatic AND gates, in FIG. 4 indicated generally at 61, and this pneumatic AND gate provides a regulated pressure to the tube 55B at a low level from a pressure regulator 62 connected to a source of air 63. The AND gate 61 has internal passageways that normally provide this pressure to the tube 55B. The AND gate inputs are connected together so that the tube 55B is a common sensing device, and when the pressure in the tube 55B drops below a desired level the AND gate acts as a fluid amplifier to provide a pneumatic signal along a tube 64 to a valve 65 that is spring biased between its two positions. The valve 65 normally provides fluid under pressure to a separate tube 66 leading to the respective cylinders 41, (as shown 41B), to urge the rod 43B outwardly to the position where it will stop rotation of its associated imprinter block. However, when the pressure signal is provided along the line 64 from the AND gate due to a drop in pressure in the line 55B, the valve 65 is actuated to provide fluid under pressure to a line 67 retracting the rod 43B. The line 66 of course would then be vented to permit the cylinder rod to retract promptly.

The AND gate 61 is a commercially available device, well known in the art. As soon as the nozzle 58B is again covered with the flapper 56B, the the pressure will build up in the tube 55B causing the AND gate to go back to its initial state removing the pressure from line 64. The spring loaded valve 65 will return to its original position so that fluid under pressure will be provided from the air source 63 to the line 66 thereby extending the rod 43B once again. Once the associated imprinting block is released, and the dough piece moves away from the sensor, the cylinder rod is extended again before the block makes a full revolution, so that the block is stopped when it reaches its original position. The cylinders 43 therefore act as a single revolution clutch.

As previously explained in connection with the imprinter block 26B, the blocks 26 are continuously urged to rotate with the shaft 23 and are retained by the position of the respective detent rods 43 of the respective cylinders 41. It can therefore be seen that when the sensing devices comprising the flappers 56 are lifted to the dotted line position due to the passage of a dough piece thereunder, the associated control circuitry for that flapper valve will operate to cause retraction of an associated cylinder rod 43. For example, rod 43B will retract and as soon as it retracts the imprinting block 26 will rotate with the shaft 23 and the shaft 23 will be timed so that it will contact the dough piece 15B substantially in the center and imprint the numeral 6, as shown, thereon. This is shown at dough piece 16B, after it has been imprinted.

As soon as the dough piece for example dough piece 15B, clears the aligned flapper valve, the rod 43B will be reextended, and will be in position to again engage and stop the imprinting block 26B when it rotates to its upright or raised position as shown in FIG. 2.

Figure 5:
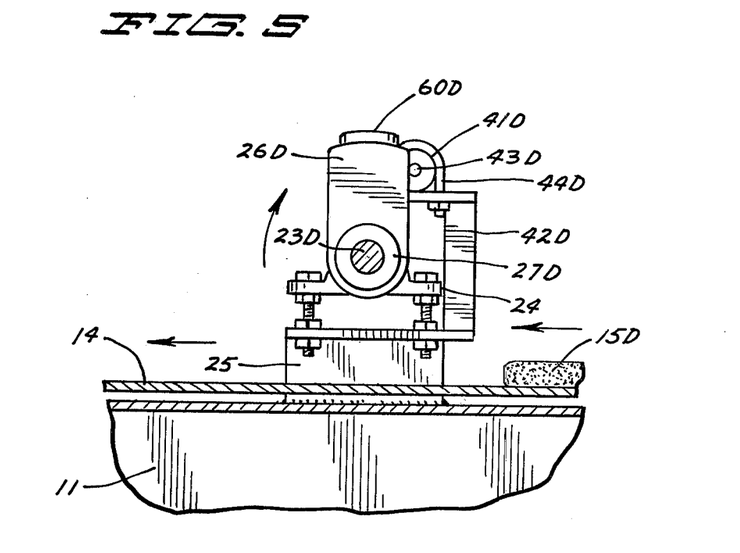
FIG. 5 is a sectional view taken as on line 5—5 in FIG. 3.

A typical side view of an imprinting block is shown in FIG. 5. This is block 26D, and there it can be seen that the rod 43D will engage the respective imprinting block below the upper edge thereof. It can be seen that the character indicated at 60 is embossed at the top of each imprinting block. That is, the character is raised from the end surface of the block, and the rounded portions are made so that they will tend to shed off the dough piece rather than tending to hook the dough piece as it would if the numeral or letter was reversed.

In order to provide adequate room for the imprinting blocks for all of the dough pieces oriented laterally across the belt, the units 21 and 22 are staggered. As can be seen, the imprinting blocks 26A and 26C are mounted onto a shaft 63 that is spaced laterally downstream with respect to direction of travel of the conveyor belt from the shaft 23 and is mounted on bearings 24 and vertically adjustable supports 25. The same type of drive is used for the shaft 63, and thus the parts are identically numbered, except for the letter designation.

The block 26A aligns with the "A" file of dough pieces, for example 15A and 16A, and when the dough piece 16A for example hits the respective sensor unit 52A, the cylinder 41A will retract its rod 43A permitting the imprinter block 26A to rotate at the proper time for imprinting the dough piece 16A with the numeral 6 forming the character 60A on the end of the imprinting block.

Each of the individual cylinders 41 will have individual controls controlled by its respective sensor unit 52. In this manner, individual controls for each of the imprinting blocks is achieved, prompt action is provided because of the constant slippage of the friction discs 28 on the respective imprinting blocks, and the safety of the drive is provided for insuring the shaft 63 will not be driven with excessive torque if for example the friction discs would happen to tend to freeze. The collars 27 can bear against spring washers that resiliently engage the friction discs for spring loading if desired.

Referring to FIGS. 6 through 11, a modified form of the invention is shown. In this form of the invention, a dough imprinter shown generally at 80 is provided, and a separate frame assembly 81 is used for supporting the dough imprinter relative to a conveyor frame 82. The conveyor frame as shown has longitudinally extending side members 82A and 82B, and an end roller 83 that mounts a conveyor belt 84 in the usual manner. The conveyor belt in this case is shown only schematically, and only one of the dough imprinter blocks is illustrated. The conveyor belt moves in the direction as indicated by the arrow 85, and carries dough pieces 86 along the belt in files and ranks as previously explained.

The frame 81 as shown has upper and lower longitudinally extending frame members 87 on opposite sides of the conveyor, and cross members 88 that tie the longitudinal members 87 together. The upper and lower longitudinal members are also connected with vertical members.

The entire frame assembly is supported relative to the side frame members 82 of the conveyor with upright supports 89 that are attached to the respective conveyor side members 82A and 82B. The dough imprinter assembly illustrated generally at 90, is generally of the same type as that previously described, but has a somewhat different sensor construction and imprinter block release devices. As shown, a shaft 91 is powered from a suitable source through a chain and sprocket drive, as for example a sprocket from one of the shafts of the conveyor drive. This chain and sprocket drive is indicated generally at 92. The shaft 91 is rotatably mounted in suitable bearings 93 that are positioned at the ends of a pair of control arms 94, which in turn are pivotally mounted as at 95 on opposite sides of the frame to supports 96 that are attached between the upper and lower ones of the longitudinal frame members 87, as can perhaps best be seen in FIGS. 7 and 10. The position of the arms 94, and therefore the elevation of the shaft 91 relative to the conveyor belt can be adjusted through the use of hand screws 97 on either side of the machine, which hand screws are threadably mounted through nuts 98 that are welded to the upper longitudinal frame members 87. The ends of hand screws 97 are rotatably mounted in suitable spherical bearings that have housings attached to the arms 94 in a suitable manner. The spherical bearings and housings are commonly called rod end bearings.

When the hand screws 97 are turned, the outer ends of the arms 94 will be raised and lowered, thereby carrying the bearings 93, and the shaft 91 up and down. It should be noted that the chain and sprocket drive can have suitable spring loaded chain tighteners to permit movement of the shaft 91 even while it is being driven. Also it can be noted that with some self alignment in the bearings 93, the individual arms 94 can be adjusted at different settings, if the conveyor is uneven or if the frame 81 is mounted unevenly.

The shaft 91 is constantly rotating when in use as in the first form of the invention, and an imprinting block 105 is rotatably mounted on the shaft and is driven with respect to the shaft 91 through a friction disc such as Delrin, or other suitable low friction plastic indicated at 106. This disc can be urged against the side of the block 105 through the use of a spring 107, and a collar 108 can be placed on the opposite side of the block to provide a backstop. Suitable discs such as 106 are also included between the collar 108 and that side of block 105.

Thus a low friction drive is provided to the imprinting block 105, and the block can be held from rotation against this low friction force through the use of a holding and release mechanism indicated generally at 110. This mechanism 110 is mounted onto a longitudinally extending support member 111 that extends longitudinally above the belt 84, and the support 111, which in the form shown is an angle iron and is attached to a support plate 112. The support plate 112 in turn is mounted through a bearing support indicated at 113 in FIG. 9 to the shaft 91 so that the outboard end of the holding and release mechanism is supported with respect to the shaft 91 while the opposite end is supported with respect to a cross member 88 in a suitable manner as indicated at 114 in FIG. 7.

Figures 8, 9, 10, 11:
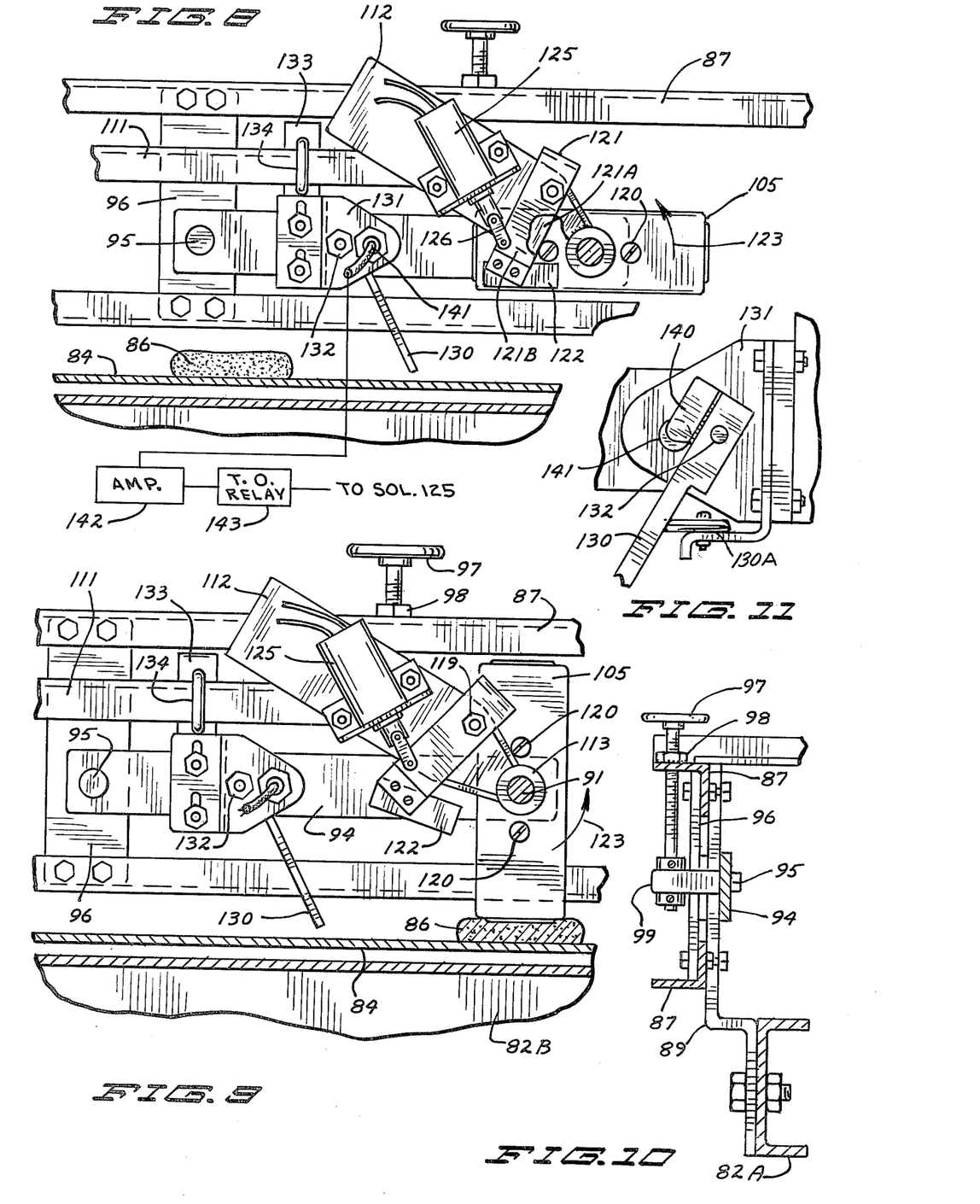
FIG. 8 is a sectional view taken on line 8—8 in FIG. 6.
FIG. 9 is a sectional view taken on the same line as FIG. 8 with an imprinter block and control in a different position.
FIG. 10 is a sectional view taken as on line 10—10 in FIG. 7.
FIG. 11 is an enlarged fragmentary view of a sensor used with the device of the second form of the invention.

The plate 112 is used for supporting the printing block stop and release mechanism. It should be noted that the block 105 has a pair of pins 120 projecting from the side thereof adjacent to the stop and release mechanism, and these pins are positioned 180° apart. A horseshoe or U shaped control member 121 is pivotally mounted with a suitable pin 119 to the plate 112, and one of the legs of member 121 (the far leg adjacent block 105 as seen in FIGS. 8 and 9) indicated at 121A carries a lug 122 that projects outwardly from the leg, and when in a position shown in FIG. 8 will intersect one of the pins 120 to hold the printing block 105 from rotating in the direction that is indicated by the arrow 123, which is the normal direction of rotation. This will hold the block 105 from rotating while the low friction drive force from the discs 106, the spring 107, and the backing collars permits the shaft 91 to be continuously driven by the drive assembly 92.

A solenoid indicated generally at 125 is also mounted onto the plate 112. As can perhaps best be seen in FIG. 8, when the solenoid is in its relaxed position (it is spring loaded so the armature moves outwardly) the member 121 is pivoted to position where the ear or lug 122 intercepts the path of pins 120 as the block 105 rotates, and when the solenoid 125 is energized, it will retract the plunger or armature of the solenoid, which is connected through a suitable link 126 to the leg 121B of the pivoting member 121, and that will move the pivoting member 121 to its position shown in FIG. 9 where the member 122 clears the path of pins 120, and permits the block 105 to rotate. As can be seen in FIG. 9 as the block rotates it will imprint a numeral (6 as shown) into a dough piece 86 that is being carried by the belt 84 and is in proper position.

The sensor for sensing the position of a dough piece 86 is in this form of the invention includes a pivotally mounted lightweight plastic strip or paddle 130 that is pivotally mounted onto a plate 131, through a mounting pin or screw 132. The plate 131 in turn is adjustably mounted as shown in FIG. 8 to a support 133 that is adjustably connected with a suitable U bolt 134 to the longitudinally extending support member 111. The pivotally mounted paddle 130 may be adjusted in several directions to give it the right amount of clearance with respect to the belt when it is in its stopped position. A suitable adjustable stop member 130A can be provided for the paddle 130 as shown schematically in FIG. 11 to limit its travel toward the conveyor belt but permit free pivoting up and away from the conveyor belt. This stop member 130A is carried by the plate 131.

Figure 6:
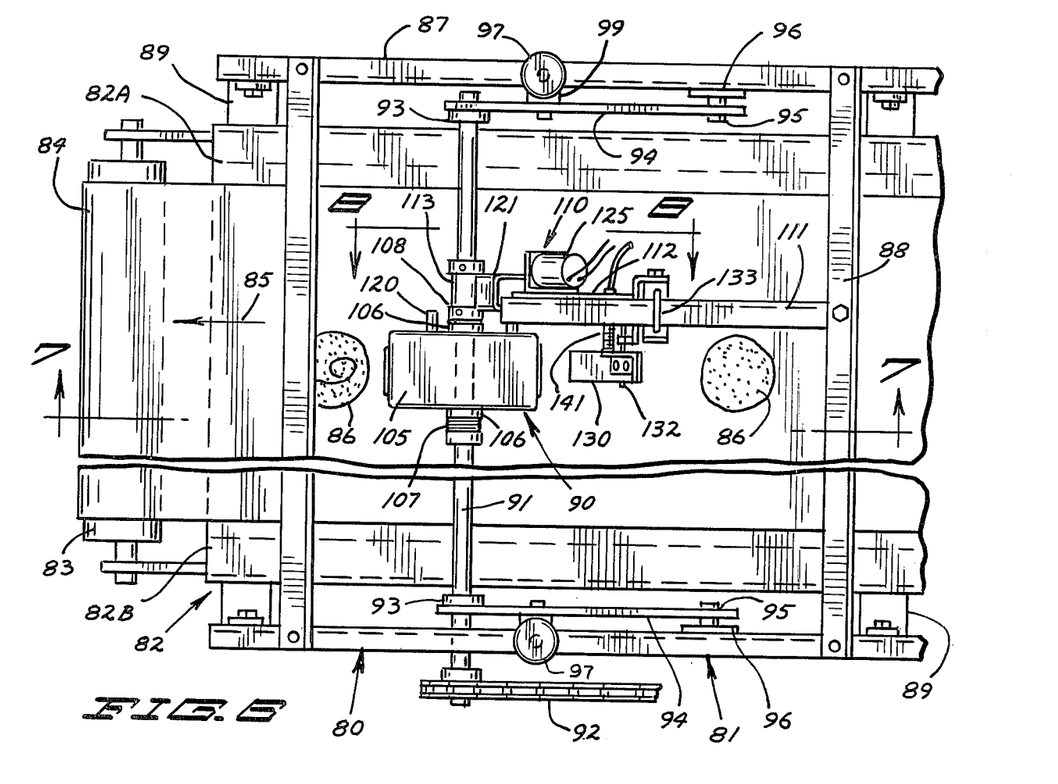
FIG. 6 is a fragmentary top view of a dough piece conveyor including a modified dough piece imprinter.
Figure 7:
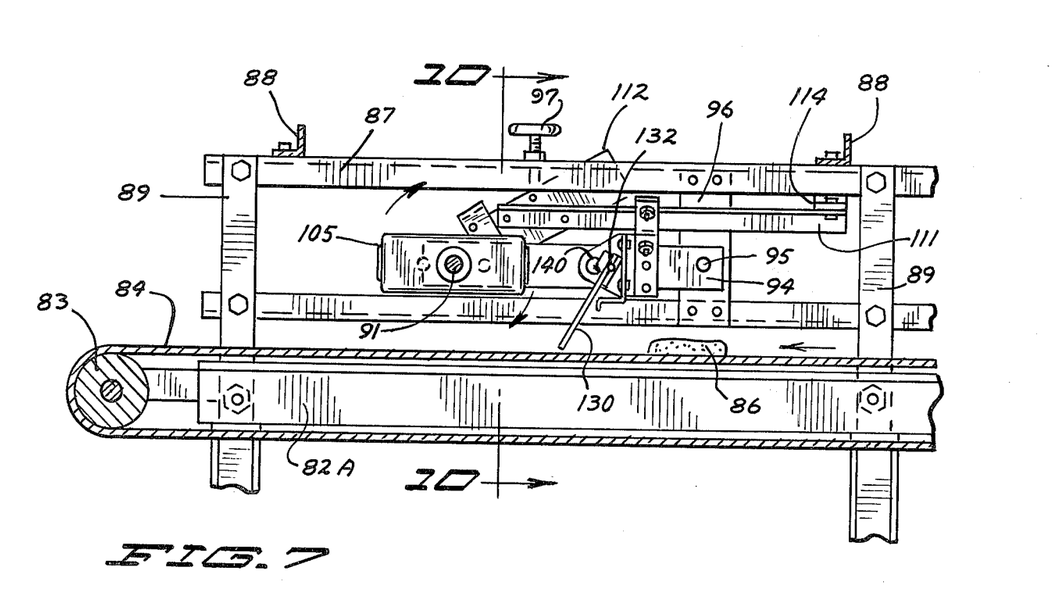
FIG. 7 is a sectional view taken on line 7—7 in FIG. 6.

The paddle 130 also carries a small metal clip which is shown at 140 in FIGS. 7 and 11, and this metal clip aligns horizontally with a proximity sensor indicated generally at 141 when the paddle is in its stopped position just clearing the belt 84. The proximity sensor 141 can be a sensor that senses or detects the presence of metal, and made by the Microswitch Division of Honeywell Inc. of Minneapolis, Minn., their number FY AA3A2-2. Other suitable proximity sensors can be utilized, but in this instance, the metal tab 140 will be positioned when the paddle 130 is in its stopped position so as to cause the proximity sensor 141 to provide a signal that permits the solenoid 125 to relax when the metal piece 140 is in front of it. When the paddle 130 lifts as when it is engaged by a dough piece 86 carried by the belt 84, (the paddles 130 are aligned with the paths of the dough piece as shown in FIG. 6) the metal piece 140 will move upwardly, and it is shaped so that the sensing area of the proximity sensor 141 is uncovered. The sensor provides a signal in the usual manner for the commercial proximity sensors to an amplifier 142 (if desired) that in turn operates through a suitable relay 143 which may have a conventional adjustable time delay, if necessary and which controls solenoid 125 to energize the solenoid, pulling the armature of the solenoid to its energized position and consequently pivoting the member 121 to position as shown in FIG. 9 wherein the lug 122 will release the previously engaged pin 120 and permit the imprinting block 105 to rotate (under friction drive from shaft 91) and contact the dough piece 86 as shown in FIG. 9. The desired legend or numeral will be imprinted on the top of the dough piece. The relay 143 is utilized for achieving the proper timing between the time when the dough piece lifts the paddle 130 and the time when the dough piece would be under the imprinting block 105.

Because of the adjustability of the sensor unit through the U bolt 134, which controls the position of the paddle 130, very little and in some instances no time delay is necessary, so that the signal from the proximity sensor 141 can be used for directly controlling the solenoid as soon as it is sensed.

Also, as soon as the dough piece clears the paddle 130 it will return to position wherein it will again move the metal piece 140 to position adjacent the proximity sensor, which is controlled to relax the solenoid 125 to return the lug 122 to its latching position so that when the pin 120 which is 180° from the one that was previously held comes back to position shown in FIG. 8, the latch 122 will engage this pin and hold the block from further rotation. Thus the block will rotate only 180° during each energization in this form of the invention, making the control a little more precise, and also providing the ability to have faster operation. However, the block will be raised above the dough pieces in each of its rest positions.

The arrangement disclosed in FIGS. 6–11 for imprinting would be typical of the sensor and imprinter used with each file of dough pieces carried on belt 84.

The use of individual sensing thus permits more precise control, and it is not as essential that the dough pieces be properly aligned in rank across the belt for imprinting. There will normally be four of the imprinter units 90 positioned in the same location as the imprinting units in the first form of the invention.

It should be noted that the pneumatic sensors also can be of the proximity type sensors. For example, air proximity sensors made by the Automatic Switch Company, Florham Park, N.J., their proximity sensor No. 6080315 has been found to be fully operative for the type of device that will sense the proximity of the blade or paddle which is to be engaged by the dough piece as it passes underneath. What is claimed is:

1. A dough imprinting device for use in combination with a conveyor means for imprinting characters onto dough pieces being transported by said conveyor means, said dough pieces being arranged in lines of a plurality of dough pieces substantially parallel to the direction of movement of said conveyor means and said dough pieces being spaced apart in direction along said lines, said device including separate sensor means for each line of dough pieces on the conveyor means sensing the position of each of the dough pieces in each of the lines and providing a signal indicating a known position of each dough piece in each line, and a separate imprinter device for each line of dough pieces, each imprinter device comprising a rotating block member carrying individual indicia to be imprinted at a plurality of annularly spaced locations at the outer edge thereof, each block member clearing said dough pieces except at the location of said indicia thereon, means to rotationally mount and frictionally drive each block member about a central axis, separate means to restrain rotational movement of each block member at a plurality of rotational positions each of which is a position with the block member clearing dough pieces on the conveyor means, said separate means to restrain being movable to a position to permit rotational movement of its associated block member, and control means responsive to receipt of said signal from the respective corresponding sensor means to move each means to restrain to position to permit its associated block member to rotate only sufficiently far for one of said indicia to imprint a dough piece sensed by the sensor means for that block member subsequent to receiving a signal from the respective sensor means and to release said means to restrain to return it to position restraining said block member prior to the time second indicia on the associated block member moves to an imprinting position.

2. The combination as specified in claim 1 wherein said means to restrain comprises a latch finger for each block member protruding into the normal path of rotation of the respective block member, and means to release said latch member to permit the associated block member to rotate as said dough piece moves from said sensor means to said block member.

3. The combination as specified in claim 2 and a shaft for rotationally mounting said rotating block members, friction disc means engaging each of said block members, and means drivably mounted on said shaft and engaging said friction disc means to exert a desired friction force tending to drive said block member.

4. The combination as specified in claim 3 and drive means for said shaft comprising means to synchronize the speed of said shaft with the speed of said conveyor means.

5. The combination of claim 2 wherein said means to restrain comprise a pivoting member having a lug normally urged to position to restrain its respective imprinting block, and said control means moving said pivoting member to position to release said block.

6. The combination as specified in claim 2 wherein said means to restrain comprises a fluid pressure cylinder having a rod, means to normally urge said rod to position extended from said cylinder, and means responsive to receipt of a signal from said sensor means to cause said rod to retract, said rod normally protruding into the rotational path of said block member when said rod is extended.

7. The combination as specified in claim 1 wherein there are two sets of rotating block members spaced longitudinally from each other with respect to direction of movement of dough pieces being imprinted.

8. The combination as specified in claim 1 wherein said sensor means includes a movable paddle positioned to align with lines of dough pieces to be imprinted moving on the conveyor means for carrying said dough pieces and intruding into the normal path of said dough pieces whereby said dough pieces will move said paddle as the dough pieces pass by, and means to sense movement of said paddle to control said means to restrain.

9. A dough piece imprinter device for use in combination with a dough piece conveyor comprising a belt member carrying a plurality of lines each formed of a plurality of spaced individual pieces of unbaked dough, each line being aligned substantially parallel to the direction of travel of said belt member, the dough pieces in each of the lines being spaced from each other in direction of movement of said conveyor belt member, a plurality of imprinting block members mounted above said conveyor, each block member having first and second imprinting portions substantially 180° apart on said block member, shaft means mounting said imprinting block members above said conveyor, said imprinting block members being rotatably mounted on said shaft means and being constructed to clear dough pieces on said conveyor except at said imprinting portions, separate friction drive means between each of said block members and said shaft means to urge said block members to rotate with said shaft means, drive means for continuously rotationally driving said shaft means to urge said imprinting block members in a path of movement whereby each imprinting portion is in a raised position during each revolution of said shaft means except for one imprinting position, separate releasable latch means to normally restrain rotational movement of each of said imprinting block members against said friction drive means with all imprinting portions on the respective imprinting block member in raised position, each of said imprinting block members being aligned with one of said lines of dough pieces, separate sensor means aligned with each of said lines of dough pieces and associated with an aligning imprinting block member, each said sensor means being positioned to be engaged by individual dough pieces in its associated line prior to passage of such individual dough piece underneath the respective imprinting block member for the respective line, and means responsive to said sensor means to release said releasable latch means when a dough piece is sensed by said sensor means, each sensor means being positioned in relation to its respective imprinter block member to cause said latch means to release and to permit its respective imprinting block member to rotate so one of the imprinting portions thereon passes through its imprinting position when a dough piece sensed passes below such imprinting block member to thereby be imprinted by the associated imprinting block member, and means controlling return of said latch means to its normal position to restrain the respective imprinting block member before another imprinting portion on the same imprinting block member moves to its imprinting position.

10. The combination as specified in claim 9 wherein said friction drive means comprises a pair of discs on said shaft means and on opposite sides of each of said rotary imprinting blocks, said discs slipping relative to the imprinting blocks when the respective latch means is holding its associated imprinting block from rotation.

* * * * *